United States Patent [19]

Atobe

[11] Patent Number: 4,549,703
[45] Date of Patent: Oct. 29, 1985

[54] DEVICE FOR PREVENTING BACKLASH ON SPOOL OF FISHING REEL

[75] Inventor: Takashi Atobe, Tokyo, Japan

[73] Assignee: Daiwa Seiko, Inc., Higashi-Kurume, Japan

[21] Appl. No.: 475,704

[22] Filed: Mar. 15, 1983

[30] Foreign Application Priority Data

Mar. 19, 1982 [JP] Japan .................... 57-39060[U]

[51] Int. Cl.⁴ .................. A01K 89/02; F16D 63/00
[52] U.S. Cl. .................. 242/84.52 B; 310/93; 310/105
[58] Field of Search ........... 242/84.52 B, 84.51 A, 242/84.51 R, 84.5 A; 310/93, 105; 188/267

[56] References Cited

U.S. PATENT DOCUMENTS

| 2,361,239 | 10/1944 | Ransom | 310/93 X |
| 2,517,926 | 8/1950 | Ransom | 242/84.52 B |
| 2,528,271 | 10/1950 | Gibbs et al. | 242/84.52 B |
| 3,120,357 | 2/1964 | Wood | 242/84.5 A |
| 4,434,951 | 3/1984 | Nakajima | 242/84.52 B |

FOREIGN PATENT DOCUMENTS

| 214801 | 5/1958 | Australia | 242/84.52 B |
| 175075 | 12/1981 | Japan | 242/84.52 B |
| 65877 | 5/1983 | Japan | 242/84.52 B |
| 137073 | 9/1983 | Japan | 242/84.52 B |
| 635116 | 4/1950 | United Kingdom | 242/84.52 B |
| 1445801 | 8/1976 | United Kingdom | 242/84.52 B |

Primary Examiner—Stuart S. Levy
Assistant Examiner—Joseph J. Hail, III
Attorney, Agent, or Firm—Fred Flam

[57] ABSTRACT

An anti-backlash fishing reel comprises a pair of side frames connected by pillars. One of the side frames supports the gear drive mechanisms. A handle projects beyond the side plate or cap attached to that frame. At the other side of the reel, the anti-backlash mechanism is located. A mounting disc or retainer case has its rim clamped to the opposite frame member by a cap or side plate. The mounting disc or retainer case carries magnetic field forming means on its inside for cooperation with a conductive eddy current drum or segment of the line spool. The mounting disc or retainer case also accommodates a bearing for the end of the spool shaft. The spool shaft is extended outwardly of the mounting disc or retainer case to mount a click wheel. Detachment of the cap or side plate allows servicing and cleaning of the magnetic field forming means without disrupting the drive mechanism at the opposite side of the reel.

6 Claims, 7 Drawing Figures

DEVICE FOR PREVENTING BACKLASH ON SPOOL OF FISHING REEL

PRIORITY

Figure 1:
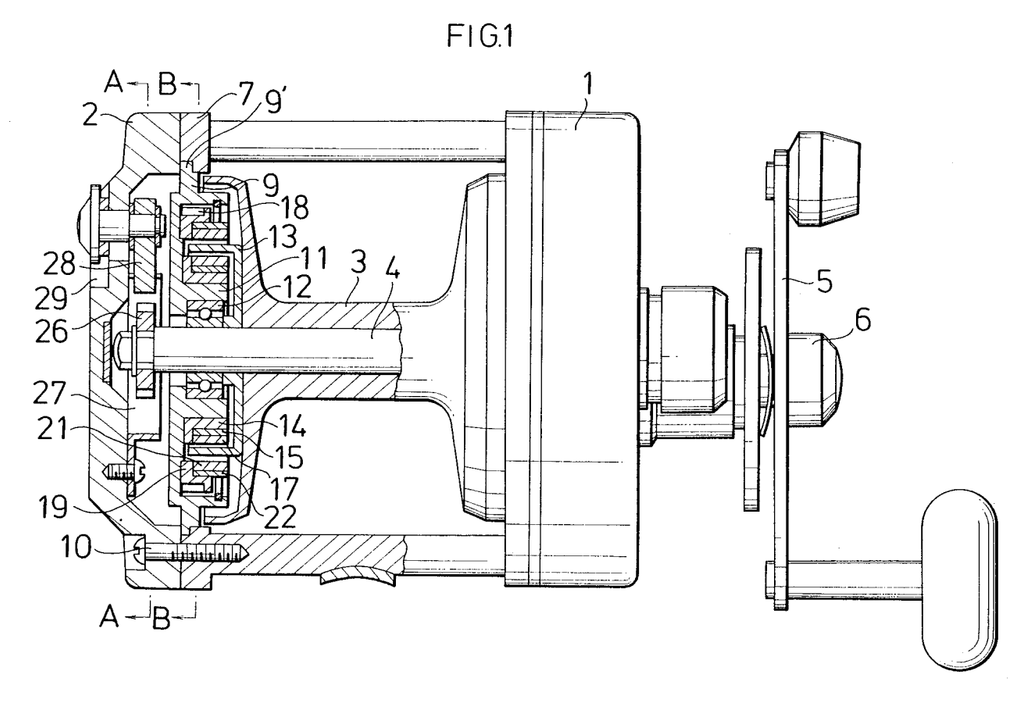
FIG. 1 is a partially cutaway view in front elevation of a fishing reel in an embodiment of the present invention.
Figure 2:
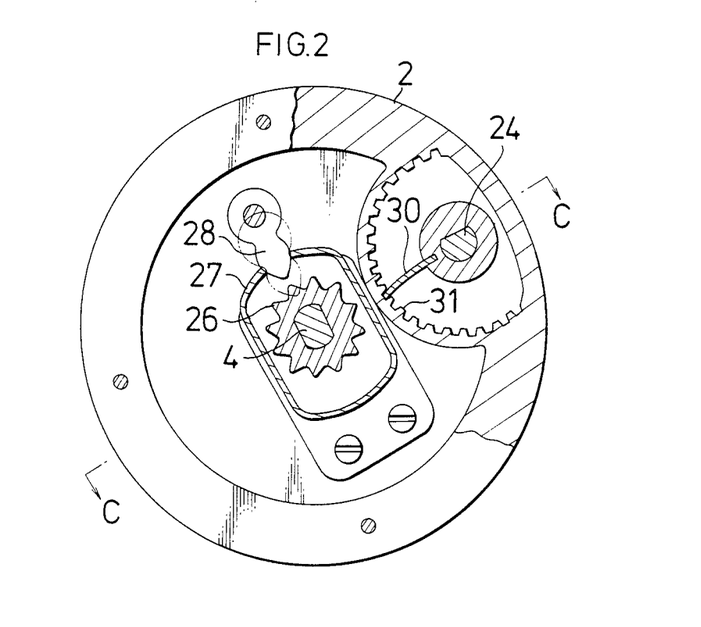
FIG. 2 is a side elevational view in longitudinal section taken along the line A—A in FIG. 1.
Figure 3:
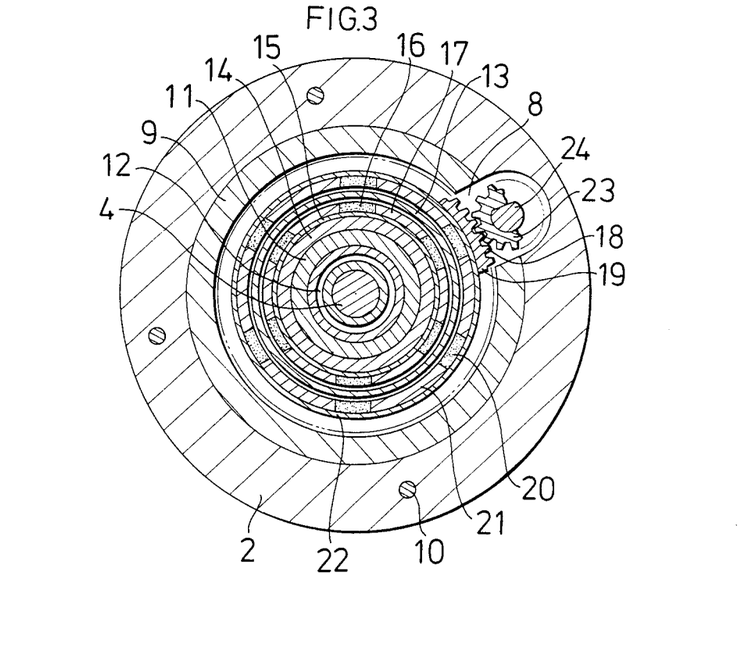
FIG. 3 is a side elevational view in longitudinal section taken along the line B—B in FIG. 1.
Figure 4:
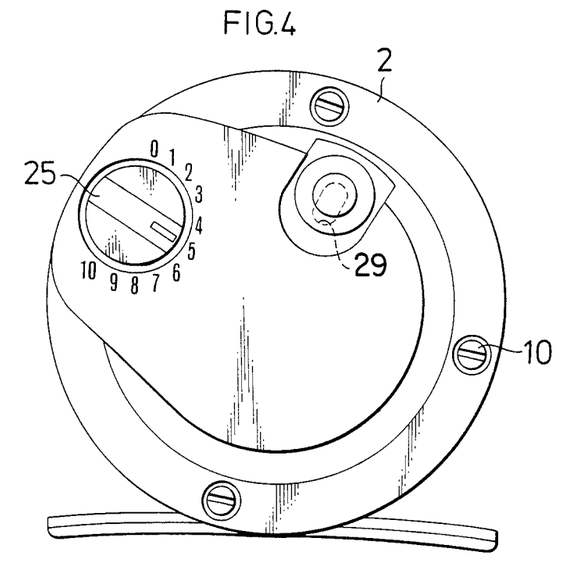
FIG. 4 is a side elevational view of the reel shown in FIG. 1.
Figure 5:
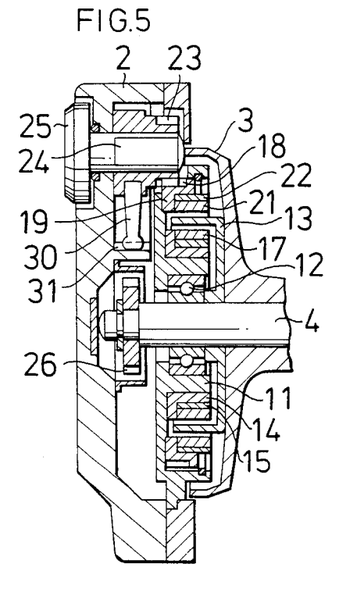
FIG. 5 is a side elevational view in longitudinal section of a principal portion of the reel shown in FIG. 1.
Figure 6:
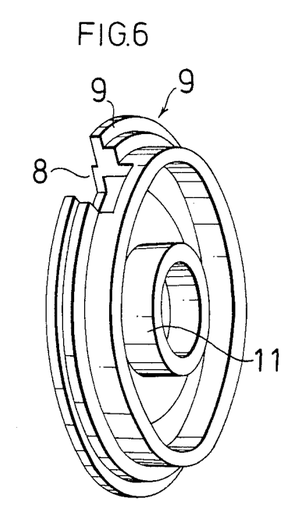
FIG. 6 is a perspective view of a principal portion of the reel shown in FIG. 1.
Figure 7:
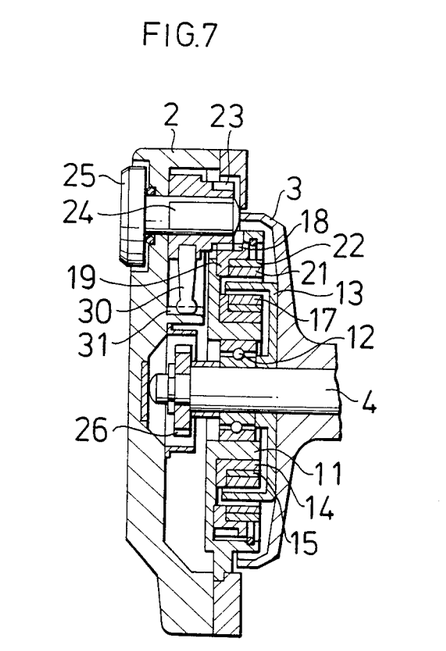
FIG. 7 is a view similar to FIG. 5, but showing a modified form of the present invention.

Priority is claimed on Japanese Application Ser. No. 57-39060 filed Mar. 19, 1982 as to the form shown in FIGS. 1 to 6. No priority is claimed as to the form shown in FIG. 7.

BACKGROUND OF THE INVENTION

This invention relates to an improvement in a device for preventing backlash on the spool of a fishing reel.

When fishing line wound around the spool of a fishing reel and having a hook an artificial bait and the like (which will be hereinafter referred to as a tackle) attached to a free end thereof is cast in an aimed area of the water, the fishing line is payed out suddenly from the spool. This causes the spool to be rotated suddenly. While the spool is thus rotated suddenly, and during the time, at which the fishing line is cast in the water, and the time, at which the tackle reaches the surface of the water, a speed, at which the fishing line is payed out, and a rotational speed of the spool do not agree with each other. Consequently, the spool is over-rotated and this often results in backlash on the fishing line wound portion of the spool.

A device for braking a spool by utilizing a permanent magnet is known in the art as a means for preventing the backlash from occurring when fishing line is payed out from a double bearing type fishing reel.

Such a spool braking device employs, as disclosed in U.S. Pat. No. 2,361,239, either a system in which a braking means consisting of a magnet is provided in a side plate of a reel, which has a spool driving means, or a system, in which a similar braking means is provided in a side plate of a reel, which is on the opposite side of a side plate thereof having a spool driving means. In a double bearing type reel of this kind, the replacement of a spool and the disassembling and cleaning of a spool driving means are usually done by detaching from a side plate, which has the spool driving means, of the reel from a frame and attaching the side member thereto afterward. The other side plate of the reel is provided with a click means. Accordingly, it is convenient to provide a braking means in the former side plate of the reel, i.e. the side plate having a spool driving means.

The system, in which a braking means is provided in a side plate, which has a spool driving means, of a reel can be applied to a small-sized reel, which does not require such a click means as mentioned above. However, when this system is applied to medium-sized and large-sized reels, which require a click means, the diameter of a driving gear and the construction of a clutch are restricted. Moreover, the iron sand in a sandy beach, which is attracted to a permanent magnet, sticks to a spool driving means to hamper an operation thereof, and it is troublesome to disassemble the braking means to remove the iron sand therefrom.

Fishing reels provided with a braking means, which consists of a magnet, and which is installed in a side plate which does not have a spool driving means, of the reel, are disclosed in U.S. Pat. Nos. 2,517,926 and 2,528,271. In the fishing reel disclosed in the former patent specification, a braking means consisting of a magnet and a click means for a spool are provided unitarily in the mentioned side plate of the reel. Therefore, the diameter of the side plate of the reel increases, and it becomes difficult to manufacture and handle the reel; this fishing reel does not have practical effect. In the fishing reel disclosed in the latter patent specification, braking means are mounted in a plurality of steps on a spool shaft, so that the dimensions of the reel increase in the axial direction thereof; this reel cannot be conveniently manufactured and handled either.

SUMMARY OF THE INVENTION

The present invention is free from the above-mentioned inconveniences. The objects of the invention are to:

(1) provide a device for preventing backlash on a spool of a fishing reel, having a high quality; capable of being manufactured easily in a short time by making a integrated dish type retainer case unit, which houses therein an eddy current-generating magnetic field-forming means and a spool shaft supporting member, which have a complicated construction, require to be processed at a high accuracy and subjected to a special maintenance inspection, and are integrally formed, and side members of the reel, which are adapted to protect the retainer case, which retainer case and side members are set on an inner frame detachably and independently of each other, subjecting each part to processing and assembling steps, which are suitable to obtain the proper function thereof, and thereafter putting the unified parts together into a complete reel; and permitting the retainer case, which is the most important functional unit of the reel, to be replaced by another as necessary while the reel is in use, and disassembled into independent parts and cleaned, (2) provide a device for preventing backlash on a spool of a fishing reel, which is capable of removing side plates of the reel and a retainer case simultaneously from an inner frame, and also a spool to be removed from the frame simply and speedily, to make it possible that, even when a spool braking rate is erroneously set during the use of the reel, in which case the backlash would occur even in the reel according to the present invention, the entangled fishing line can be put in order manually, and which permits as mentioned above the spool to be easily replaced by a spare spool on hand, and (3) provide a device for preventing backlash on a spool of a fishing reel, which is capable of being designed in such a manner that an eddy current-generating magnetic field-forming means and a spool shaft supporting member are disposed in the nearest possible position with respect to a spool to make it possible to fully utilize for the magnetic field-forming means the surface of a spool flange which is opposed to a side plate of the reel, prevent the spool shaft from being bent owing to the spool shaft supporting member formed in the central portion of the reel and in the nearest position with respect to the spool, and easily maintain a high fitting accuracy of each part, and which permits installing a click means axially parallel to the retainer case having the above-mentioned means, to contribute greatly to the advantageous designing of a reel, cause a decrease in an outer diameter of the reel, and improve the handiness of the reel.

BRIEF DESCRIPTION OF THE DRAWINGS

A detailed description of the invention will be made with reference to the accompanying drawings wherein.

DETAILED DESCRIPTION OF PREFERRED EMBODIMENT

The following detailed description is of the best presently contemplated modes of carrying out the invention. This description is not to be taken in a limiting sense, but is made merely for purposes of illustrating the general principles of the invention, since the scope of the invention is best defined by the appended claims. Structural and operational characteristics attributed to forms of the invention first described, shall also be attributed to forms later described, unless such characteristics are obviously inapplicable or unless specific exception is made.

The side plates or end caps 1, 2 of a double bearing type reel support thereon a spool shaft 4 around which a spool 3 is fixedly fitted. A spool driving means (not shown) is provided in one side plate 1 of the reel. The spool driving means connects as generally known a handle shaft 6 having a handle 5 and the spool shaft 4 together via a clutch means in such a manner that the handle shaft 6 and spool shaft 4 can be engaged with and disengaged from each other. When the handle 5 is turned, fishing line can be taken up around the spool 3 and payed out with the spool 3 set free.

A dish type retainer case or mounting disc 9 having a recess 8 is fixed removably via a mounting rim or edge 9' with screws 10 between a circumferential portion of the other side plate 2 of the reel, which does not have the spool driving means therein, and an inner frame 7. A hub 11 at the central portion of the retainer case 9 supports the spool shaft 4 via a bearing 12. An annular, non-magnetic, conductive member 13 consisting of aluminum is provided on a side surface of the spool 3 so as to project toward the retainer case 9.

An annular frame 14 is fixed to an outer surface of the hub 11 of the retainer case 9. An inner, annular magnetic pole member 17 having permanent magnets 16 is fixedly fitted around an outer circumferential surface of the annular frame 14 via a yoke 15 in such a manner that the magnetic pole member 17 is opposed to an inner circumferential surface of the annular, non-magnetic, conductive member 13. A cylindrical member 19 having teeth 18 on its outer circumferential surface is pivotally provided on the inner side of an inner circumferential surface of the retainer case 9. An outer, annular magnetic pole member 21 having permanent magnets 20 which are so arranged that the permanent magnets 20 are opposed via the annular non-magnetic conductive member 13 to such permanent magnets 16 that have a polarity different to that thereof, are fixedly fitted around an inner circumferential surface of the pivotable cylindrical member 19 via a yoke 22. A gear 23 meshed with the teeth 18 and fixedly mounted on a shaft 24 supported on the side plate 2 of the reel, is provided in the recess 8 in the retainer case 9.

Accordingly, when a dial 25 mounted on the shaft 24 is turned, the cylindrical member 19 is pivotally moved via the gear 23 and teeth 18. Consequently, the outer, annular magnetic pole member 21 is turned to vary the positions, in which the permanent magnets 20 in the pole member 21 are opposed to the permanent magnets 16 in the inner, annular magnetic pole member 17, and thereby regulate the magnetic flux density between these annular magnetic pole members 17, 21.

A click gear 26 is fixedly mounted on the portion of the spool shaft 4 which is outside the retainer case 9. A click pawl 28 held on a spring 27 is provided on the side plate 2 of the reel in such a manner that the click pawl 28 can be engaged with and disengaged from the click gear 26 via an elongated bore 29. A click spring 30 provided at a base portion of the gear 23 is resiliently engaged with teeth 31 formed on the side plate 2 of the reel to retain and restrict the position of the gear 23.

The embodiment is constructed as described above. Accordingly, in order to take up or pay out fishing line with the handle shaft 6 and spool shaft 4 in engagement with each other, the click pawl 28 is brought into engagement with the click gear 26 via the elongated bore 29. Consequently, the spool 3 is turned forward or backward to cause the pawl 28 to click while generating resistance in the spool shaft 4.

The occurrence of backlash can be prevented when a fishing line is cast with the spool 3 set free. When fishing line is cast to cause the spool 3 to be turned, an eddy current is generated in the annular, non-magnetic, conductive member 13 by the inner and outer, annular magnetic pole members 17, 21 to brake the spool 3, i.e. prevent the excessive rotation of the spool 3. In order to regulate a spool braking force, the dial 25 is turned to vary the positions, in which the permanent magnets 16, 20 are opposed to one another, and thereby increase or decrease the magnetic flux density between the magnetic pole members 17, 21.

When iron sand or the like sticks to the inner and outer, annular magnetic pole members 17, 21, the screws 10 are removed to separate the retainer case 9 from the side member 2 of the reel and inner frame 7, and then clean the magnetic pole members 17, 21.

According to the present invention, a braking means consisting of magnets and a click means are compactly housed in a side member, which does not have a spool driving means, of a double bearing type reel of this kind to maintain the right and left side members of the reel in a substantially balanced state. The present invention permits this type of magnetic braking means to be applied easily to a large-sized double bearing type reel, which requires a click means, and the reel to be thereby handled easily. The braking means is housed in a dish type retainer case, and can be easily set and withdrawn by merely removing a side plate of the reel. Therefore, the braking means can be easily disassemble and cleaned when iron sand or the like sticks thereto. In addition, the braking means can be assembled and disassembled very easily. The braking means consisting of magnets can be compactly installed with a click means in a large-sized reel. The present invention has such excellent characteristics and practicality.

In the above-described embodiment, the eddy current-generating non-magnetic conductive member is annularly formed. However, the shape of the eddy current-generating member is not limited to the shape referred to above; the member may have any shape provided that it is capable of generating an eddy current. The shape of the magnetic field-forming means is not limited either to that employed in the above embodiment. For example, each of the inner and outer, annular magnetic pole members 17, 21 can be formed with a single magnet.

DETAILED DESCRIPTION OF THE SECOND EMBODIMENT

The diameter of the click gear 26 in the form of the embodiment of FIGS. 1 to 6 is greater than the inner diameter of the hub 11 of the retainer case 29. However, the inner diameter of the hub 11 may be greater than the outer diameter of the click gear 26. Thus, in FIG. 7, the spool 3 can be replaced by another freely by removing the side plate 1 or 2 of the reel from the inner frame 7. When the hub 11 is formed to such a greater inner diameter, the bearing 12 is retained on the spool shaft 4.

Intending to claim all novel, useful and unobvious features shown or described, I make the following claims:

1. In a double shaft support fishing reel having provisions for preventing spool backlash:
   (a) first and second side frame members;
   (b) strut means securing at opposite ends thereof, said side frame members to define a cage for a spool;
   (c) first and second side plates detachably secured to the first and second side frame members respectively;
   (d) a spool having a shaft;
   (e) first spool shaft support means carried by said first side plate;
   (f) spool shaft driving means accommodated in said first side plate;
   (g) a mounting disc having a peripheral rim fitted between and engaging both said second side plate and said second frame member, said mounting disc having means registering said disc with said second frame member, said rim being confined to its fitted relationship by said second side plate;
   (h) second spool shaft support means fitted to said mounting disc whereby the transverse bearing load of spool shaft is transmitted directly to said second frame member through said registering means, said transverse bearing load thereby bypassing said second side plate, said first and second shaft support means being aligned and together defining an axis of rotation of said spool shaft;
   (i) magnetic field forming means carried entirely by said mounting disc and detachable therewith, said magnetic field forming means being directly opposed to the corresponding end of said spool; and
   (j) an electrically conductive annular eddy current member carried by said spool and projecting into the magnetic field formed by said magnetic field forming means whereby a magnetic drag is imposed upon said spool as a function of its rotational speed.

2. The fishing reel as set forth in claim 1 in which said magnetic field forming means includes an element mounted on said disc for angular movement about said axis to vary the operative strength of said magnetic field and correspondingly, the magnetic drag imposed upon said spool; and a manually movable adjustment member carried with said end plate and engageable with said element selectively to determine the angular position of said element.

3. The fishing reel as set forth in claim 2 in which said adjustment member includes a pinion gear and said element includes a spur gear with a gear ratio therebetween sufficient to provide a one way drive for stability of said element; said magnetic field forming means comprising permanent magnets mounted on said element and said disc respectively, there being an annular space therebetween, said annular member projecting into said annular space; angular movement of said element changing the alignment of said magnets on opposite sides of said space whereby the strength of the magnetic field is varied.

4. The fishing reel as set forth in claim 1 in which said spool shaft has an end projecting through said mounting disc and through said second spool shaft support means; a click gear mounted on said projecting spool shaft end; and a click pawl retractably mounted on said second end plate for selective engagement with said click gear.

5. A device for preventing backlash on the spool of a fishing reel:
   (a) a pair of side frame members;
   (b) a spool having a shaft, one end of which projects through one of said side frame members, said one of said side frame members having an opening for insertion and removal of said spool therethrough;
   (c) gear drive means cooperable with said one shaft end;
   (d) an end plate or cap enclosing the gear drive means and attached to said one of said side frame members;
   (e) a mounting disc having a rim fitted to and registered with a large opening of the other of said frame members;
   (f) magnetic field forming means mounted on the inside of said mounting disc;
   (g) bearing means for said spool shaft fitted to said mounting disc, said spool having an eddy current member positioned to interact with said magnetic field forming means for backlash control;
   (h) an end plate overlying said other frame member and said mounting disc and detachably securing said mounting disc and corresponding frame member together;
   (i) the other end of said spool shaft projecting beyond said other frame member and through said mounting disc;
   (j) a click wheel carried on said projecting other end of said spool shaft;
   (k) said bearing means being carried by said spool shaft;
   (l) said click wheel being smaller in diameter than the diameter of said bearing means whereby the mounting disc may be detached with said end plate without removal of said click wheel from said spool shaft and whereby said spool may be removed through said opening of said one frame member without removal of said click wheel from said spool shaft.

6. In a double shaft support fishing reel having provisions for preventing spool backlash:
   (a) first and second side frame members;
   (b) strut means securing at opposite ends thereof, said side frame members to define a cage for a spool;

(c) first and second side plates detachably secured to the first and second side frame members respectively;
(d) a spool having a shaft;
(e) first spool shaft support means carried by said first side plate;
(f) spool shaft driving means accommodated in said first side plate;
(g) a mounting disc having a peripheral rim fitted between said second side plate and said second frame member, said mounting disc having means registering said disc with said second frame member, said rim being confined to its fitted relationship by said second side plate;
(h) second spool shaft support means fitted to said mounting disc, said first and second shaft support means being aligned and together defining an axis of rotation of said spool shaft;
(i) magnetic field forming means carried entirely by said mounting disc and detachable therewith, said magnetic field forming means being directly opposed to the corresponding end of said spool; and
(j) an electrically conductive annular eddy current member carried by said spool and projecting into the magnetic field formed by said magnetic field forming means whereby a magnetic drag is imposed upon said spool as a function of its rotational speed;
(k) said spool shaft having an end projecting through said mounting disc;
(l) a click gear mounted on said projecting spool shaft end; and
(m) a click pawl retractably mounted on said second end plate for selective engagement with said click gear;
(n) said second shaft support means being carried on said spool shaft;
(o) said mounting disc providing a central aperture larger than the diameter of said click gear for detachment of said mounting disc while said click gear is in place on the projecting end of said spool shaft.

* * * * *

REEXAMINATION CERTIFICATE (1767th)
United States Patent [19]

Atobe

[11] B1 4,549,703

[45] Certificate Issued Aug. 11, 1992

[54] DEVICE FOR PREVENTING BACKLASH ON SPOOL OF FISHING REEL

[75] Inventor: Takashi Atobe, Tokyo, Japan

[73] Assignee: Daiwa Seiko, Inc., Tokyo, Japan

Reexamination Request:
No. 90/002,652, Feb. 24, 1992

Reexamination Certificate for:
Patent No.: 4,549,703
Issued: Oct. 29, 1985
Appl. No.: 475,704
Filed: Mar. 15, 1983

[30] Foreign Application Priority Data

Mar. 19, 1982 [JP] Japan ................... 57-39060

[51] Int. Cl.[5] .................... A01K 89/033; F16D 63/00
[52] U.S. Cl. ........................ 242/288; 310/93; 310/105
[58] Field of Search ............. 242/288, 310, 312, 321; 310/93, 105

[56] References Cited

U.S. PATENT DOCUMENTS 765,554  7/1904  Carter ................... 242/315

FOREIGN PATENT DOCUMENTS 56-66263  4/1981  Japan .
56-111677  7/1981  Japan .
57-31175  1/1982  Japan .

*Primary Examiner*—Joseph J. Hail, III

[57] ABSTRACT

An anti-backlash fishing reel comprises a pair of side frames connected by pillars. One of the side frames supports the gear drive mechanisms. A handle projects beyond the side plate or cap attached to that frame. At the other side of the reel, the anti-backlash mechanism is located. A mounting disc or retainer case has its rim clamped to the opposite frame member by a cap or side plate. The mounting disc or retainer case carries magnetic field forming means on its inside for cooperation with a conductive eddy current drum or segment of the line spool. The mounting disc or retainer case also accommodates a bearing for the end of the spool shaft. The spool shaft is extended outwardly of the mounting disc or retainer case to mount a click wheel. Detachment of the cap or side plate allows servicing and cleaning of the magnetic field forming means without disrupting the drive mechanism at the opposite side of the reel.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *